JAMES G. CASSANOS
KEITH H. BUTLER
INVENTORS

JAMES G. CASSANOS
KEITH H. BUTLER
INVENTORS

JAMES G. CASSANOS
KEITH H. BUTLER
INVENTORS

JAMES G. CASSANOS
KEITH H. BUTLER
INVENTORS

JAMES G. CASSANOS
KEITH H. BUTLER
INVENTORS

Patented Apr. 19, 1949

2,467,810

UNITED STATES PATENT OFFICE 2,467,810

BARIUM MAGNESIUM LEAD SILICATE PHOSPHOR

James G. Cassanos, Woburn, and Keith H. Butler, Marblehead, Mass., assignors to Sylvania Electric Products Inc., Salem, Mass., a corporation of Massachusetts Application June 17, 1947, Serial No. 755,116

4 Claims. (Cl. 252—301.4)

This invention relates to luminescent materials and more particularly to barium-magnesium-lead silicate phosphors capable of excitation by short wave-length U. V. light.

An object of this invention is to provide a barium-magnesium-lead silicate phosphor adapted to be used in the preparation of a blue fluorescent lamp or as the blue component in fluorescent lamps of other colors.

Another object is to provide a phosphor for use in sign tubing.

Further objects, advantages and features will be apparent from the following specification when read in conjunction with the accompanying drawings in which.

In the co-pending application of Keith H. Butler, Serial Number 725,779 filed February 1, 1947 it was pointed out that in lead-activated barium silicate phosphors, the lead acted both as an activator and as a modifier of the fluorescence. We have found that the color of the fluorescent light can be modified also by a partial substitution of magnesium for barium. Another result of this substitution is that it is possible to obtain good phosphors with a lower content of lead and of silicic acid than is possible with lead-activated barium silicate phosphors with no magnesium present in the composition.

We have found that useful fluorescent materials can be made over a wide range of composition. Thus the ratio of the number of mols of barium to the total mols of barium plus magnesium may vary from about 1.0 to about 0.2, while the lead content may vary from about 0.01 to about 1.30, and the silicic acid content may vary from about 0.05 to 1.8 net mols per mol of barium plus magnesium. The term "net mols" of silicic acid refers to the number of mols of $SiO_2$ per mol of barium plus magnesium after subtracting one mol of $SiO_2$ for each mol of lead used in the raw material blend.

The permissible range of variation in the barium-magnesium ratio, the lead content, and the silicic acid content has certain limitations which will be apparent from a study of the accompanying drawings. There are also certain preferred compositions which give the highest output.

For example, when the ratio of mols of barium to the sum of the mols of barium plus magnesium is about 0.8, the best phosphors are obtained with a net silicic acid content of between about 1.0 and about 1.5 mols per mol of barium and magnesium with the lead content between about .05 and about 0.6 mol per mol of barium and magnesium. If this ratio of the barium to the sum of the barium plus magnesium is changed to about 0.6, we have found that there are two sharply defined silicic acid contents which give the most efficient phosphors, one of these occurring at about 0.90 net mols and the other at about 1.30 net mols, with the optimum lead content being at about 0.2 mol in each case. If the barium content is further decreased so that the barium ratio becomes about 0.4, we again find two optimum silicic acid contents, one occurring at about 0.75 net mol and the other at about 1.3 net mols. With the lower silicic acid content, the optimum amount of lead appears to be about 0.2 mol while with the higher silicic acid content, the optimum lead content appears to be about 0.35 mol. The accompanying drawings show other optimum combinations of barium, magnesium, lead and silicic acid.

Figure 1:
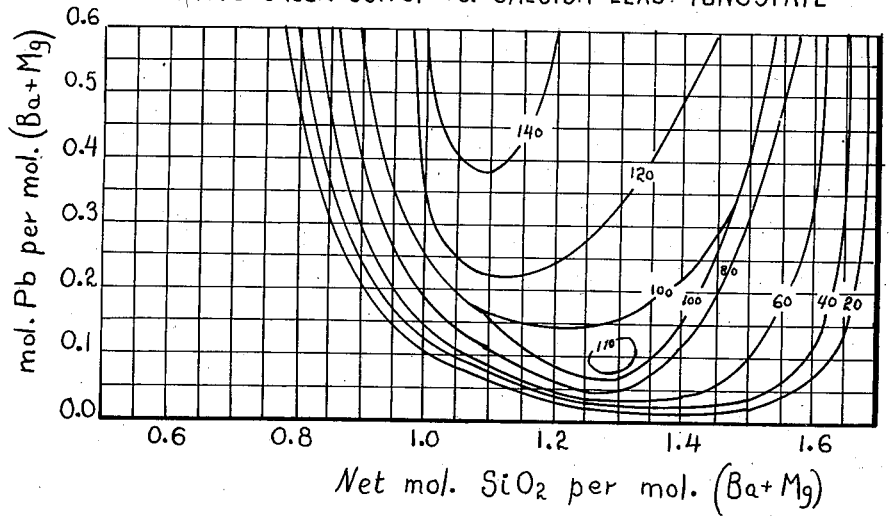
Figure 1 represents the green emission of barium-magnesium-lead silicate phosphors containing 0.8 mol of barium and 0.2 mol magnesium.
Figure 2:
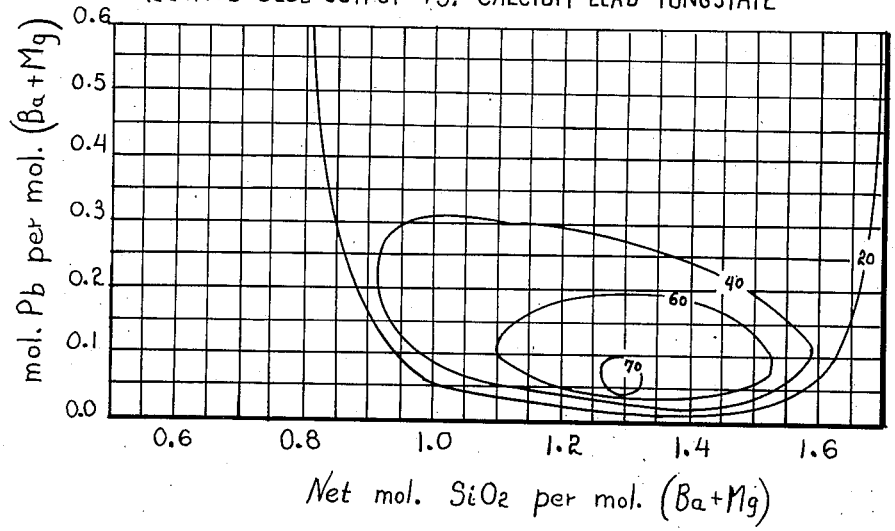
Figure 2 represents the blue emission of barium-magnesium lead silicate phosphors containing 0.8 mol of barium and 0.2 mol magnesium.
Figure 3:
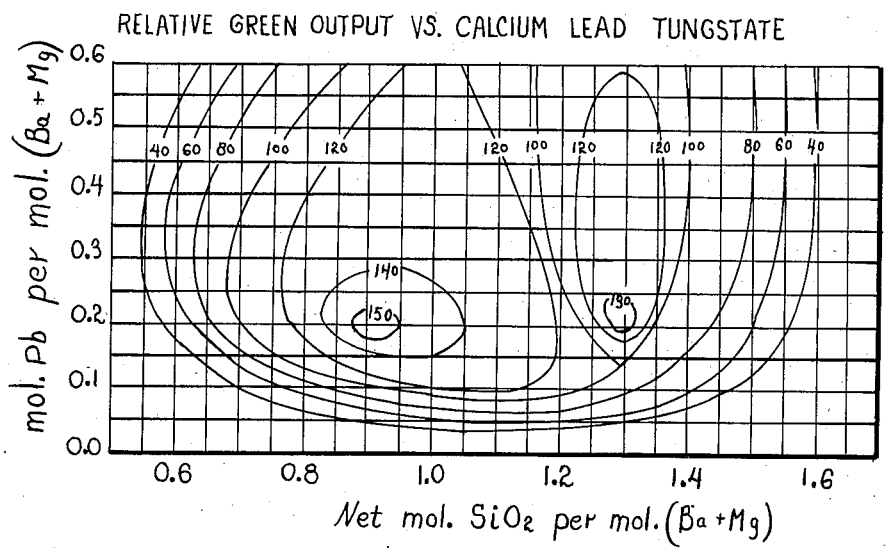
Figure 3 represents the green emission of barium-magnesium-lead silicate phosphors containing 0.6 mol of barium and 0.4 mol of magnesium.
Figure 4:
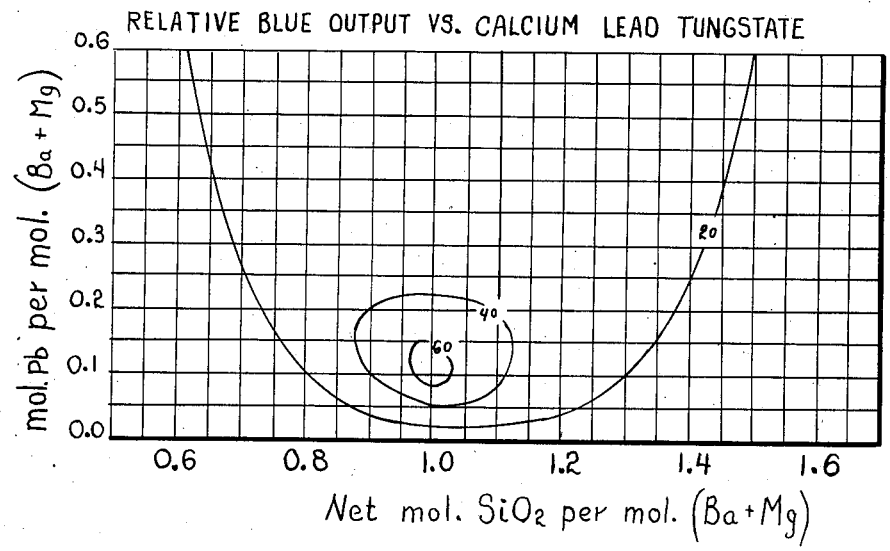
Figure 4 represents the blue emission of barium-magnesium-lead silicate phosphors containing 0.6 mol of barium and 0.4 mol of magnesium.
Figure 5:
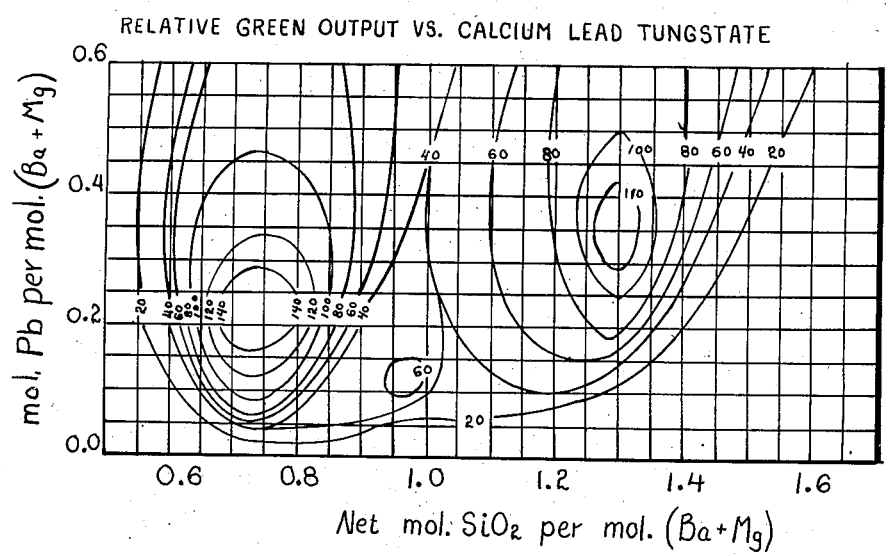
Figure 5 represents the green emission of barium-magnesium-lead silicate phosphors containing 0.4 mol of barium and 0.6 mol of magnesium.
Figure 6:
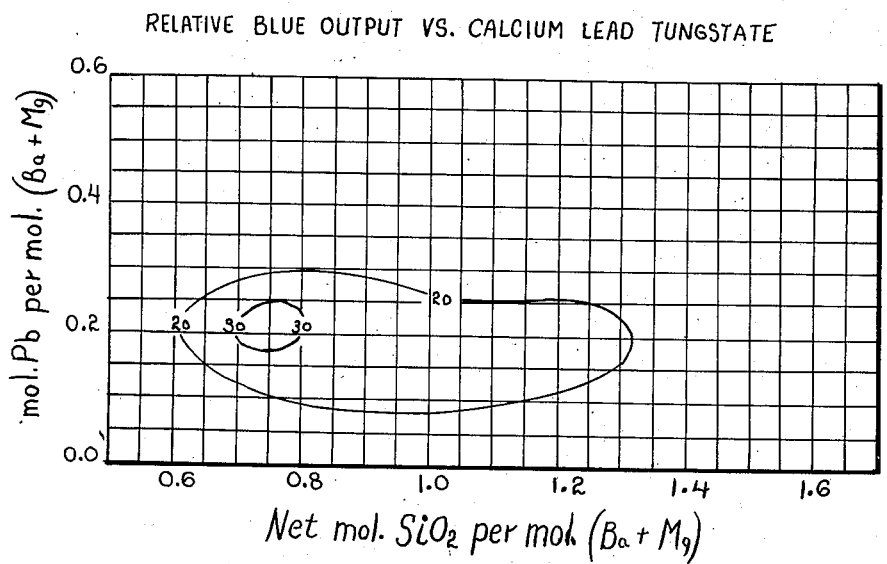
Figure 6 represents the blue emission of barium-magnesium-lead silicate phosphors containing 0.4 mol of barium and 0.6 mol of magnesium.
Figure 7:
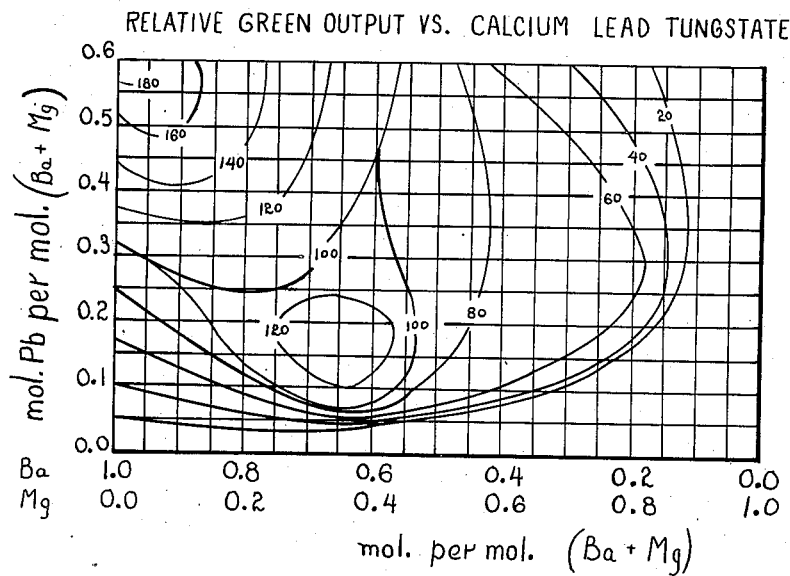
Figure 7 represents the green emission of barium-magnesium-lead silicate phosphors containing 1.15 net mols of silicic acid per mol of barium plus magnesium, with varying ratio of barium to magnesium and varying lead content.
Figure 8:
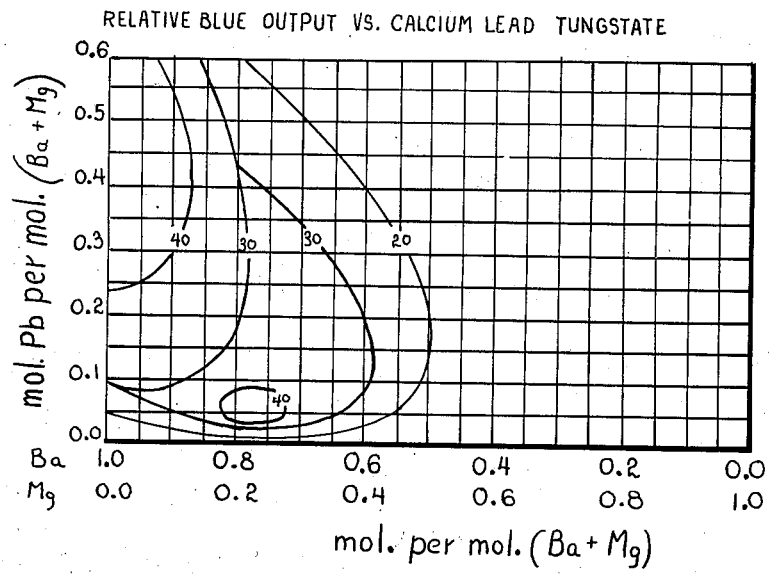
Figure 8 represents the blue emission of barium-magnesium-lead silicate phosphors containing 1.15 net mols of silicic acid per mol of barium plus magnesium, with varying ratio of barium to magnesium and varying lead content.
Figure 9:
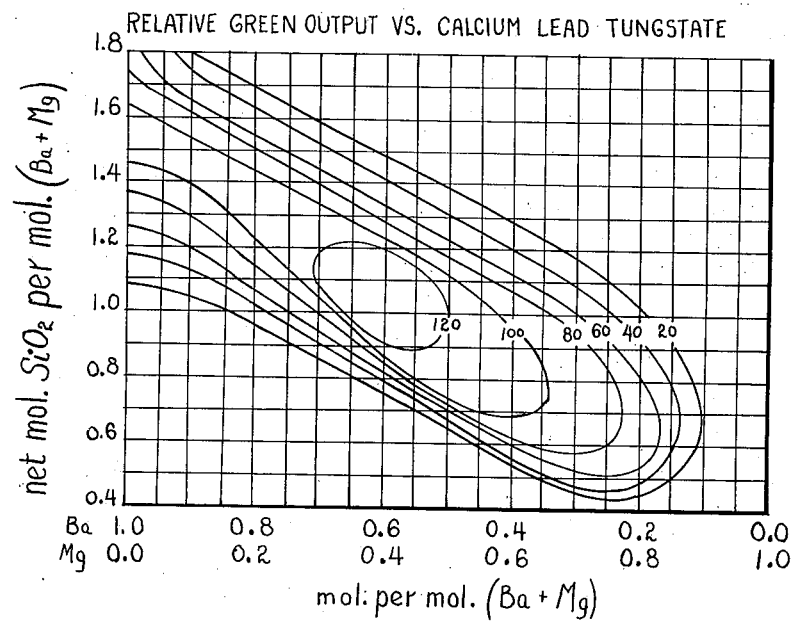
Figure 9 represents the green emission of barium-magnesium-lead silicate phosphors containing 0.1 mol of lead per mol of barium plus magnesium, with varying barium to magnesium ratio and varying silicic acid content.
Figure 10:
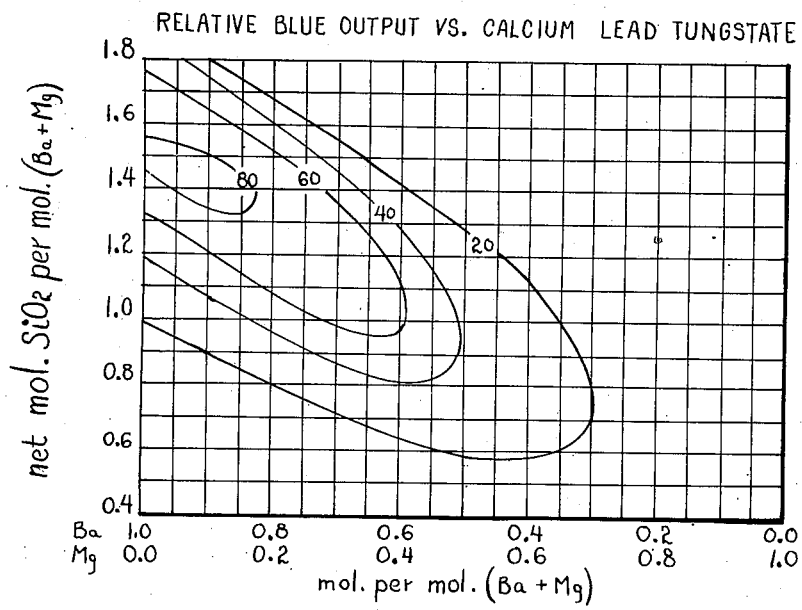
Figure 10 represents the blue emission of barium-magnesium-lead silicate phosphors containing 0.1 mol of lead per mol of barium plus magnesium, with varying barium to magnesium ratio and varying silicic acid content.

We have determined the efficiency and color of the fluorescent light simultaneously by illuminating the phosphor with light from a low pressure mercury arc in a quartz envelope. This light emits a large amount of 2537Å radiation. The fluorescent light emitted by the sample is measured by a Weston photronic cell after passage through a suitable filter. As filters we have employed Wratten tricolor gelatin filters cemented in glass. In this way, we measure the glue, green, and red components of the fluorescent light. Since this procedure gives only an arbitrary measurement, we also measure a standard powder along with each sample and express the output of the samples as a percentage of this standard for each color. For testing the fluorescent materials described in this specification, calcium lead tungstate, which is commonly employed in making blue fluorescent lamps, was selected as the standard. The emission of red light is usually negligible so that these readings have not been recorded herein. Measurements of the fluorescent light emitted by these phosphors have been made on a large number of samples covering a wide range, and from these measurements the contour diagrams of Figures 1–10 have been drawn.

In the preparation of these phosphors, we use one mol of silicic acid for each mol of lead present, and express the difference between the total mols of silicic acid and the amount used to form lead metasilicate as the net $SiO_2$, which is free to combine with the barium and magnesium to form an alkaline earth silicate.

We prefer to use the following method of preparation though other methods known to those skilled in the art may be used without departing from the spirit of our invention. Sufficient quantities of silicic acid, of barium carbonate, of lead carbonate, and of basic magnesium carbonate to make the desired composition are wet milled in water, using ball mills containing flint pebbles, for 2–16 hours. After milling, the mixture is filtered and the cake dried, crushed, or dry ground, and then fired in silica vessels for about 4 hours at a suitable temperature. The firing temperature required depends to a considerable extent on the composition of the phosphor and may vary from 1300° to 2100° F. After the fired phosphor has cooled, it is dry ground in a hammermill or pebble mill until sufficiently fine to pass a 40 mesh sieve. The dry ground material is then refired in silica vessels at a somewhat lower temperature than is used for the first firing. The optimum temperature for this second firing depends on the composition of the phosphor but will generally fall within the range of 1200° to 1800° F. The step of dry grinding and refiring is not essential for the production of a useful fluorescent material but has been found to give improvement in fluorescent output in certain cases.

We have also found it advantageous to employ a catalyst, such as barium fluoride, in amounts from 0.02 to 0.5% by weight, based on the total weight of the raw materials used. The function of this catalyst is to accelerate the reaction of the raw materials and permit firing at a lower temperature. This reduction in firing temperatures results in a reduction in particle size of the fluorescent powder. However, such a catalyst is not essential to the preparation of the phosphors and may be omitted if desired.

As one example of the improvement resulting from the use of magnesium, a barium silicate phosphor containing about .1 mol of lead and 1.05 net mols of silicic acid per mol of barium has a very low output, with the reading through the green filter being less than 20% of that obtained with calcium lead tungstate. If, instead of using one mol of barium, we use about 0.7 mol of barium and about 0.3 mol of magnesium in the composition, a phosphor having a reading through the green filter of 176% of calcium lead tungstate and a reading through the blue filter of 70% of calcium lead tungstate is produced. The light from this phosphor is blue-green and is quite saturated in tint.

When this material is used in a 20 watt fluorescent lamp the initial output of the lamp is approximately 31 L. P. W. whereas the L. P. W. of a 20 watt fluorescent lamp in which calcium lead tungstate is employed as the fluorescent material is about 25.

We prepared such a phosphor by wet milling together 276 grams of barium carbonate, 56 grams of basic magnesium carbonate, 53 grams of lead carbonate, 157 grams of silicic acid containing about 87% $SiO_2$, and 3.5 grams of barium fluoride. This mixture was ground in a 1 gallon porcelain jar mill with flint pebbles for about 16 hours, using 1300 cc. of water as the suspending agent. The resulting suspension was filtered, dried, and crushed. It was then charged into a silica vessel and fired for 3½ hours at a temperature of 1760° F., after which it was removed from the furnace and allowed to cool in the air. The resulting powder was removed from the crucible, crushed to pass a 40 mesh sieve, and the output of fluorescent light measured as specified above. This single-fired powder had an output of 118% of the output of calcium lead tungstate when measured through the green filter and 54% of calcium lead tungstate when measured through the blue filter. The powder was then charged into a silica vessel again and refined for four hours at a temperature of 1400° F., after which it was removed from the furnace and allowed to cool in the air. This double fired powder then had a green emission of 176% and a blue emission of 70%, as compared with the output of calcium lead tungstate.

A further example of the effect of magnesium in our new fluorescent compounds is found in phosphors containing less than 1.0 net mol of silicic acid per mol of barium and magnesium. Compounds of barium, lead, and silicic acid containing less than 1.0 mol of silicic acid are generally colored yellow or brown under the normal conditions of preparation. If however, about 0.4 mol of barium and about 0.6 mol of magnesium are used with about 0.2 mol of lead and about 0.7 net mol of silicic acid, a white fluorescent material is obtained which has an output measuring 174% through a green filter and 38% through a blue filter as compared to a calcium lead tungstate standard. When this material is used in a 20 watt fluorescent lamp, the initial output of the lamp is approximately 33 L. P. W. whereas the L. P. W. of a 20 watt fluorescent lamp in which calcium lead tungstate is employed as the fluorescent material is about 25.

To prepare such a phosphor, we ground in a gallon mill with flint pebbles, using about 1800 cc. of water as a suspending agent, a mixture of 316 grams of barium carbonate, 225 grams of basic magnesium carbonate, 222 grams of lead carbonate, 246 grams of silicic acid containing about 87% $SiO_2$, and 7.0 grams of barium fluoride. After milling for 4 hours, the suspension was filtered, dried, and the cake crushed. It was then fired in a silica vessel for 4 hours at 1580° F., crushed, and the resultant powder fired a second time for 4 hours at 1400° F. The single fired powder had a green emission of 140% and a blue emission of 31%, as compared with the output of calcium lead tungstate. Refiring this powder increased its output to 174% through a green filter and 38% through a blue filter, as compared with the calcium lead tungstate standard.

The lead activated barium magnesium silicate phosphors of our invention may be used advantageously as the blue-green component when blended with zinc orthosilicate and zinc beryllium silicates in the preparation of 3500° white, 4500° white, and 6500° daylight fluorescent lamps. In the preparation of the powders for a 3500° white blend, for example, we mixed together 40 grams of lead-activated barium magnesium silicate, 4 grams of manganese-activated zinc orthosilicate, and 156 grams of manganese-activated zince beryllium silicate. In preparing the zinc orthosilicate, we used about 1.0 mol of zinc oxide, about 0.58 mol of silicic acid, and about 0.05 mol of manganese. In preparing the zinc beryllium silicate, we used about 0.9 mol of zinc oxide, about 0.1 mol of beryllium oxide, about 0.58 mol of silicic acid, and about 0.05 mol of manganese. In preparing the barium magnesium lead silicate used in this blend, we used about 0.825 mol of barium oxide, 0.175 mol of basic magnesium carbonate, 0.075 mol of lead carbonate, and a total of about 1.40 mol of silicic acid. The barium magnesium silicate was processed in a manner similar to that described in the examples above and had a green emission of 147% through a green filter and a blue emission of 80% when compared with calcium lead tungstate. When this blend was used in a 20 watt fluorescent lamp, the color was a visual match for a standard 3500° white fluorescent lamp, and the lamp had an initial output of 51 lumens per watt.

What we claim is:

1. A barium-magnesium-lead silicate phosphor in which the ratio of the number of mols of barium to the total mols of barium plus magnesium is between about 1.0 to about 0.2, the lead content is between about 0.01 mol to about 1.3 mols, and the silicic acid is between about 0.05 mol to about 1.8 mols plus an additional mol of silicic acid for each mol of lead used.

2. A barium-magnesium-lead silicate phosphor in which the ratio of the number of mols of barium to the sum of the mols of barium plus magnesium is about 0.8, the lead content is between about .05 mol to about 0.6 mol, and the silicic acid is between about 1.0 mol to about 1.5 mols plus an additional mol of silicic acid for each mol of lead used.

3. A barium-magnesium-lead silicate phosphor in which the ratio of the number of mols of barium to the sum of the mols of barium plus magnesium is about 0.6, the lead content is between about .05 mol to about .6 mol, and the silicic acid is between about .6 mol to about 1.5 mols plus an additional mol of silicic acid for each mol of lead used.

4. A barium-magnesium-lead silicate phosphor in which the ratio of the number of mols of barium to the sum of the mols of barium plus magnesium is about 0.4, the lead content is between about .05 mol to about .6 mol, and the silicic acid is between about .6 mol to about 1.5 mols plus an additional mol of silicic acid for each mol of lead used.

JAMES G. CASSANOS.
KEITH H. BUTLER.

REFERENCES CITED

The following references are of record in the file of this patent:

UNITED STATES PATENTS

| Number | Name | Date |
|---|---|---|
| 2,299,510 | Steadman | Oct. 20, 1942 |

FOREIGN PATENTS

| Number | Country | Date |
|---|---|---|
| 572,771 | Great Britain | Oct. 23, 1945 |